United States Patent [19]
McAllister

[11] 3,793,813
[45] Feb. 26, 1974

[54] PLEATED FILTER ASSEMBLY

[75] Inventor: Robert L. McAllister, Louisville, Ky.

[73] Assignee: American Air Filter Company, Inc., Louisville, Ky.

[22] Filed: May 19, 1972

[21] Appl. No.: 254,873

[52] U.S. Cl............. 55/481, 55/499, 55/514, 55/521, 55/528, 210/493
[51] Int. Cl............................................ B01d 27/06
[58] Field of Search........... 55/496–500, 478–481, 55/521, 514, 528; 210/493

[56] References Cited
UNITED STATES PATENTS

| | | | |
|---|---|---|---|
| 1,220,888 | 3/1917 | Porter | 55/500 |
| 1,832,281 | 11/1931 | Davies | 55/497 |
| 3,246,456 | 4/1966 | Sharp | 55/500 |
| 3,246,457 | 4/1966 | DeBaun | 55/521 |
| 3,494,113 | 2/1970 | Kinney | 55/497 |

FOREIGN PATENTS OR APPLICATIONS

| | | | |
|---|---|---|---|
| 1,229,579 | 3/1960 | France | 55/497 |

Primary Examiner—Bernard Nozick

[57] ABSTRACT

A filter assembly comprising an outer housing having upstream and downstream openings to permit fluid flow therethrough, an inner housing having an upstream and downstream opening therein to permit fluid flow therethrough, the inner housing being adapted for being received by the outer housing, and a pleated filter medium disposed transverse the direction of fluid flow between the upstream and downstream openings, the pleated filter being adapted to be received by the inner housing.

3 Claims, 2 Drawing Figures

PATENTED FEB 26 1974　　　　　　　　　　　　　　　　3,793,813

PLEATED FILTER ASSEMBLY

BACKGROUND OF THE INVENTION

The present invention relates to fluid filters. In one aspect, it relates to a filter assembly utilizing pleated filter media. In another aspect, the invention relates to a pleated filter assembly including means for easy removal and replacement of pleated filter media.

In air filtration systems which are installed in office buildings, industrial plants, and particularly in residences, replaceable type filters have been utilized. For many years, filters utilizing non-woven fibrous material, such as non-woven fiberglas, as a filtering media have been used in these air filtration systems for removing undesirable particles from the air. The filters presently in use come in many sizes and shapes and are constructed by many different methods, but the most common type of filters in use today is one in which a basic core of loosely packed glass fibers bound together by a resinous coating is confined between two closely perforated sheets of brass. However, the efficiency of these filters is of a relatively low order.

SUMMARY OF THE INVENTION

In the present invention, it is recognized that it is desirable to provide a filter which is inexpensive but yet durable in present air filtering systems. Furthermore, it is recognized that it is desirable to provide a filter which is easily constructed with improved efficiency for use in residential air filtering systems.

The present invention advantageously provides a straightforward arrangement for a pleated filter assembly. The present invention further provides a filter assembly which is relatively inexpensive to install and maintain. The present invention even further provides a pleated filter assembly wherein the media is easily replaced and has an improved filter efficiency in residential air filtering systems.

Various other features of the present invention will become obvious to those skilled in the art upon reading the disclosure set forth hereinafter.

More particularly, the present invention provides a pleated filter assembly comprising an outer housing having an outer border frame defining an open upstream and downstream end to permit fluid flow therethrough; an inner housing having an inner border frame member defining an open upstream and downstream end to permit fluid flow therethrough, the inner housing being adaptable to be received by and within the outer housing; and, a pleated filter medium disposed transverse the direction of the fluid flow between the upstream and the downstream ends, the pleated filter medium being adapted to be received by the inner housing.

It is to be understood that the description of the present invention given hereinafter are not by way of limitation and various modifications within the scope of the present invention will occur to those skilled in the art upon reading the disclosure set forth hereinafter.

Referring to the drawing.

Figure 1:
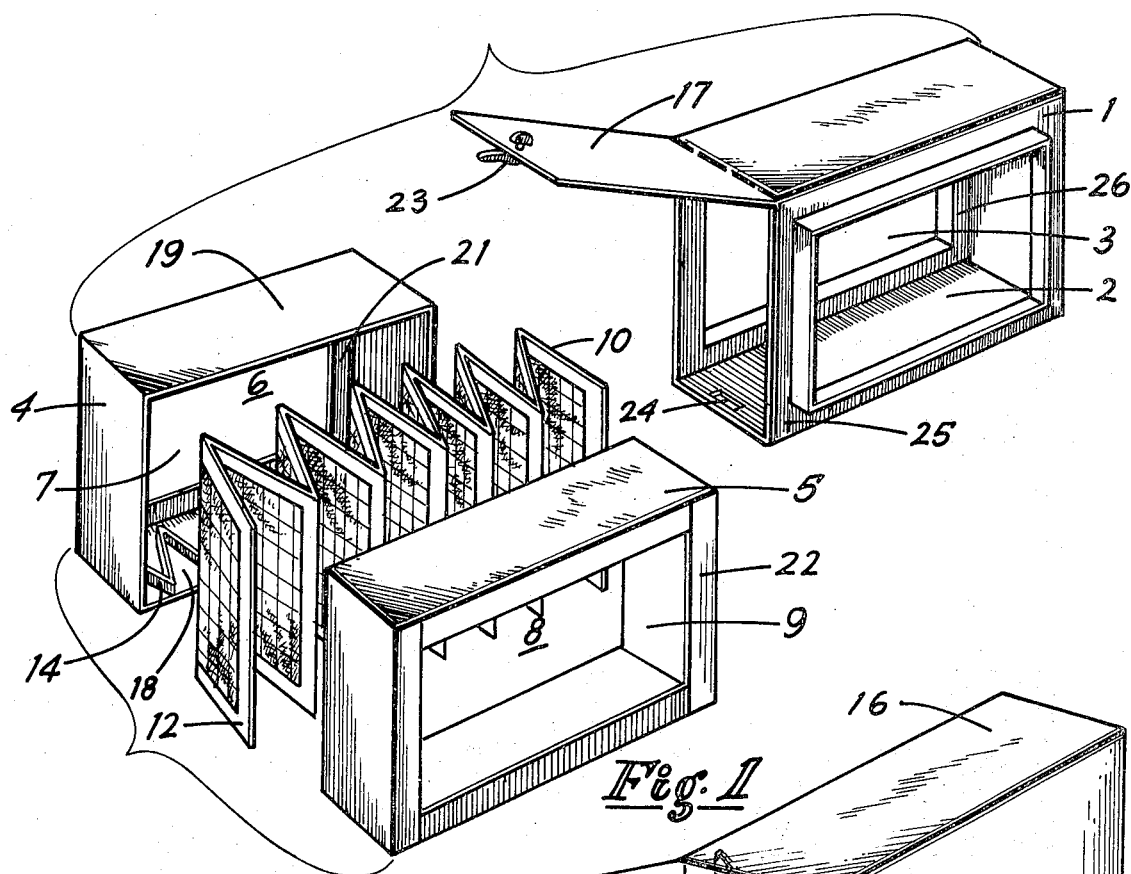
FIG. 1 is an exploded perspective view of the filter assembly of the present invention.

FIG. 1 of the drawing illustrates an exploded structure of a filter assembly of the present invention. The filter assembly in the illustration includes an outer housing 1 having an upstream flow-through opening 2 therein with flanged portion 25 extending inwardly along the periphery thereof and a downstream flow-through opening 3 therein with flanged portion 26 extending inwardly along the periphery thereof. A second or inner housing is provided and includes border frame members 4 and 5, border frame member 4 having an upstream air opening 7 and a downstream air opening 6 therein with inwardly extending flange 21 disposed along the periphery of the opening 6, and border frame member 5 having an upstream air opening 9 with inwardly extending flange 22 disposed along the periphery of the opening 9 and a downstream air opening 8 therein. Border frame member 4 has an outer periphery of generally the same size and shape as the inner periphery of the border frame member 5 wherein border frame 4 will mate within border frame member 5 in a telescoping relationship. Disposed within the inner housing and in communication with the border frame 4 is a pleated filter media 10, the pleated filter media 10 being formed from any suitable filter material known in the art, one preferred filter material being non-woven cotton linters of generally about ⅛ inch to about ¼ inch in thickness with a backing of cheesecloth, netting, or the like. It is realized that the inner housing may be of unitary construction and include only border frame member 4 instead of the example which illustrates border frame members 4 and 5 mating in telescoping relation. However, for disposition of a filter assembly in a vertically extending air passageway, an inner housing including border frame members 4 and 5 is preferred since border frame member 4 including inwardly extending flange 21 along the periphery of the downstream air opening 6 and border frame member 5 including an inwardly extending flange 22 along the periphery of the upstream air opening 9 maintain the filter media 10 in place in the inner housing during insertion of the inner housing into an outer housing disposed in the vertically extending air passageway.

Figure 2:
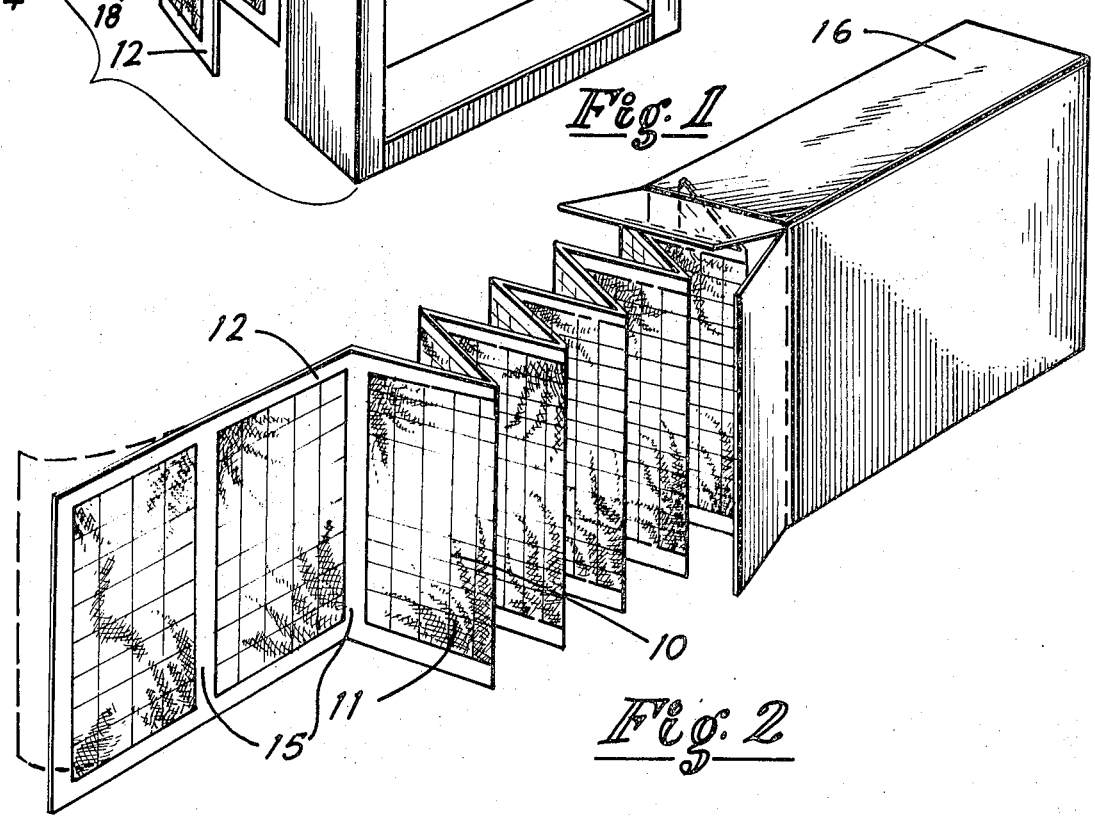
FIG. 2 is an enlarged perspective view of the filter media included in the filter assembly of FIG. 1.

The pleated filter media 10 may also be collapsible into a small package for shipment. As can be seen in FIG. 2 of the drawing, for packaging, the filter media 10 of the high efficiency particulate air filter type is laminated to a corrugated support grid 12 which may be formed from, for example, a suitable stiff cardboard material, the cardboard grid having interior transversely extending support portions 15. The corrugated grid 12 may be folded, for example, along the transverse support portions 15 to a compact state for inserting into box 16 for shipment.

The border frame 4 which receives the filter media 10 therein includes a raised spacing portion 14 disposed along the inner wall of side 18 of the frame 4, spacing portion 14 extending transversely across the frame in a zig-zag configuration whereby media 10 being bent along corrugated grid 12 at support portions 15, as described above, is positioned within the border frame member in zig-zag communication with the spacing portion 14 thereby maintaining the media 10 in a pleated and supported condition when in operation. Spacing portion 14 is illustrated as a raised rib member attached to the wall 18 by any known means, such as gluing, soldering, riveting, or the like. The raised rib member as illustrated is a die cut corrugated cardboard, cut in a preselected zig-zag configuration, but may be of other construction, such as molded polystyrene beads. Further, the raised spacing portion 14 may be an integral part of the frame member 6 if so desired. It is realized that a second raised spacing portion may be utilized along the inner wall of side 19, the spacing portion (not shown) extending transversely in a zig-zag configuration across the inner wall of side 19 in cooperation with the spacing portion 14 to hold the pleated filter media 10 in a predetermined zig-zag configuration.

Outer housing 1 further includes a pivotally mounted side member 17 which when pivoted outwardly leaves an opening of a sufficient size to receive inner housing border frame 5 including border frame 4 and filter media 10 therethrough. Side member 17 also includes locking means, such as, tongue 23 and mating groove 24 for securing inner housing, including the filter media 10, in place during operation.

In the preparation of the filter assembly of the present invention, a pleated filter media 10 is inserted into border frame member 4 wherein support grid 12 is aligned with spacer portion 14 of wall 18. Inner border frame member 4 is then slidably mounted in telescoping relationship within border frame member 5, inwardly extending flange 21 along the periphery of the downstream opening 6 and inwardly extending flange 22 along the periphery of the upstream air opening 9 holding filter media 10 in place. Side member 17 is then pivoted into a position to allow the insertion of the inner housing including filter media 10 therein into the outer housing 1.

In order to replace a filter 10 whenever it becomes dirty or clogged with solid particulate matter, all that is necessary is to open the side member or door 17, remove the inner housing including the filter media 10 and slidably remove the inner border frame 4 from the inner border frame 5, remove the dirty filter 10, replace with a clean filter media 10, and reverse the aforementioned procedure and replace in the outer housing 1.

It will be realized that various changes may be made to the specific embodiment shown and described without departing from the principles of the present invention.

What is claimed is:

1. A pleated filter assembly comprising: an outer housing including an outer border frame member defining an open upstream and downstream end to permit fluid flow therethrough; an inner housing having an inner border frame member defining an open upstream and downstream end to permit fluid flow therethrough, said inner housing including a flow-through outer border frame member, said border frame members mating in a removably detachable telescoping relationship, said outer border frame member having an inwardly extending flange along the periphery of an outer end, said inner border frame member including four sides with a raised rib member of a preselected zig-zag configuration along at least one of said sides thereof aligning with and supporting a pleated filter medium in a zig-zag configuration, said pleated filter medium including a corrugated support grid having transversely extending support portions, said support grid being bent along said transversely extending support portions to form a support grid of zig-zag configuration, said inner housing being removably disposed within said outer housing, said pleated filter medium being disposed transverse the direction of the fluid flow between said upstream and downstream ends of said inner housing.

2. The pleated filter assembly of claim 1 wherein said outer housing includes a pivotally mounted side member therein for receiving said inner housing therethrough.

3. A pleated air filter assembly for use in a vertically extending air passageway, said assembly comprising: an outer housing including an outer border frame member defining an open upstream and downstream end to permit fluid flow therethrough; an inner housing having an inner border frame member defining an open upstream and downstream end to permit fluid flow therethough, said inner housing including a flow-through inner border frame member and a flow-through outer border frame member, said border frame members mating in a removably detachable telescoping relationship, said outer border frame member having an inwardly extending flange along the periphery of an outer end, said inner border frame member including four sides with a raised rib member of a preselected zig-zag configuration along at least one of said sides thereof aligning with and supporting a pleated filter medium in a zig-zag configuration, said pleated filter medium including a corrugated support grid having transversely extending support portions, said support grid being bent along said transversely extending support portions to form a support grid of zig-zag configuration, said inner housing being removably disposed within said outer housing, said pleated filter medium being disposed transverse the direction of the fluid flow between said upstream and downstream ends of said inner housing.

* * * * *